United States Patent Office 3,842,169
Patented Oct. 15, 1974

3,842,169
COMPOSITION AND METHOD FOR TREATMENT OF PATHOLOGICAL CALCIFICATION IN ANIMALS
Herbert D. Schneyer, Our Lane, Stevenson, Md. 21153
No Drawing. Continuation-in-part of application Ser. No. 72,216, Sept. 14, 1970, now Patent No. 3,709,989, which is a continuation of application Ser. No. 871,666, Nov. 10, 1969, which is a continuation of application Ser. No. 586,947, Oct. 17, 1969, both now abandoned, which is a continuation-in-part of application Ser. No. 318,779, Oct. 22, 1963, now Patent No. 3,279,997, which is a continuation-in-part of application Ser. No. 124,305, July 10, 1961, which in turn is a continuation-in-part of application Ser. No. 836,174, Aug. 26, 1959, both now abandoned. This application Jan. 5, 1973, Ser. No. 321,395
The portion of the term of the patent subsequent to Jan. 9, 1990, has been disclaimed
Int. Cl. A61k 27/00
U.S. Cl. 424—232      6 Claims

ABSTRACT OF THE DISCLOSURE

A composition and method are disclosed for treating animals for pathological calcification and preventing the formation thereof. The composition comprises enteric coated aspirin, enteric coated salt of lactic acid or derivative thereof, thiamine hydrochloride, and an antihistamine.

CROSS-REFERENCE TO RELATED APPLICATIONS

This application is a continuation-in-part of my copending application Ser. No. 72,216, filed Sept. 14, 1970, now U.S. Pat. No. 3,709,989, which is a streamlined continuation of my copending application Ser. No. 871,666, filed Nov. 10, 1969, and now abandoned, which is a streamlined continuation of my copending application Ser. No. 586,947, filed Oct. 17, 1966, and now abandoned, which is a continuation-in-part of my copending application Ser. No. 318,779, filed Oct. 22, 1963, now U.S. Pat. 3,279,997, which is a continuation-in-part of my copending application Ser. No. 124,305, filed July 10, 1961, and now abandoned, which in turn is a continuation-in-part of my copending application Ser. No. 836,174, filed Aug. 26, 1959, and now abandoned.

BACKGROUND OF THE INVENTION

The present invention relates to a composition and method for treating animals for pathological calcification and preventing the formation thereof.

Calcification is the deposition of insoluble lime salts in the matrix of cartilage; this deposition of insoluble lime salts, under normal conditions, builds up the cartilage to form bone. However, when the condition is pathological, i.e., a physiological deviation from normal that constitutes a disease or characterizes a particular disease, there is too great a deposition of lime salts around the cartilage in the body with a resulting buildup of hard deposits in the body that are quite painful. This condition is commonly known as pathological calcification.

SUMMARY OF THE INVENTION

It has now been discovered that the combination of enteric coated aspirin, enteric coated salt of lactic acid or derivative, methapyrilene hydrochloride, and an antihistamine, is effective in treating pathological calcification in animals. Continued administration of the composition of the present invention results in a decrease in the size, and eventual disappearance, of the pathological lime salt deposits in the body, with an accompanying alleviation of the pain associated with the condition.

In normal oral administration, calcium lactate and aspirin will dissolve in the stomach so as to produce merely an alkalizing or acidifying effect depending on which is in the greater concentration. However, the present invention contemplates the use of a lactic acid salt, lactic acid derivative salt, or lactic acid itself, such as calcium lactate, which is covered with a suitable enteric coating to prevent the dissolution of the calcium lactate or other lactate salt in the stomach. The aspirin is also covered with an enteric coating to prevent its dissolution in the stomach. The enteric coating used for the compositions of the present invention may be of any conventional composition.

The enteric coated lactate salt and aspirin are then combined in a capsule or packet, for example, along with thiamine hydrochloride and in antihistamine. Examples of antihistamines that can be used in the compositions of the present invention include methapyrilene hydrochloride, diphenhydramine, pyrilamine, tripelennamine, phineramine, as well as any of the many other pharmaceutically acceptable antihistamines; additionally, other compounds having antihistamine activity in vivo could be employed.

In the compositions of the present invention, the uncoated thiamine hydrochloride and uncoated antihistamine dissolve in the stomach, but the enteric coated lactate salt and enteric coated aspirin pass through the stomach and do not dissolve until they reach the intestines.

The composition as described above has been found to be useful in the treatment of pathological calcification in animals.

The calcium lactate is present in the compositions of the present invention in amounts ranging from about 1 to about 15 grains. The aspirin is present in amounts ranging from about 0.25 to about 3.0 grains. The thiamine hydrochloride is present in amounts ranging from about 10 milligrams to about 60 milligrams, and the antihistamine is present in amounts ranging from about 10 milligrams to about 60 milligrams.

A suitable unit dosage of the composition for adult human use is based on about 10 grains of enteric coated calcium lactate, 2.5 grains of enteric coated aspirin, 50 milligrams of thiamine hydrochloride, and 50 milligrams of methapyrilene hydrochloride.

DESCRIPTION OF THE PREFERRED EMBODIMENTS

Example I

Gelatin capsules are prepared containing the following active ingredients:

Calcium lactate (enteric coated) _____grains__ 10
Thiamine HCl _____milligrams__ 50
Methapyrilene HCl _____do____ 50
Aspirin (enteric coated) _____grains__ 2.5

In order to prepare capsules of the above composition, the calcium lactate and aspirin are first given an enteric coating made according to the standard U.S.P. specification. For example, 75 pounds calcium lactate N.F. or 75 pounds aspirin N.F. are mixed with 12.5 pounds of corn starch. The mixture is dampened with 3 gallons of a solution of ethyl cellulose in alcohol prepared by dissolving 1 pound of ethyl cellulose in sufficient alcohol to make 1 gallon. The wetted mass is dried at 140° F., and milled, using a Fitzpatrick Mill operated at low speed, equipped with a #2 screen. Then 12 ounces of talc and 6 ounces of magnesium stearate are added. The mixture is compressed into granules having a gross weight of 0.5 grains. (The loss of moisture from the calcium lactate compensates for the weight of excipients added.)

The granules are transferred to a coating pan and coated with cellulose acid phthalate. After about seven coats have been applied, the granules are tested using standard U.S.P. Disintegration Testing Apparatus. The granules should resist simulated gastric fluid U.S.P. for one hour, simulated intestinal fluid U.S.P. modified to pH 4.5 for an additional hour, and simulated intestinal fluid U.S.P. modified to pH 6.9 for an additional hour. They should then disintegrate when transferred to simulated intestinal fluid U.S.P. modified to pH 7.2 within one hour. If this is not the case, additional coats of cellulose acetate phthalate should be added and the disintegration procedure rechecked. When the granules of calcium lactate or aspirin have been satisfactorily coated, they should be placed into a dispenser for filling into the capsules or packets along with the remaining materials.

The thiamine hydrochloride and methapyrilene hydrochloride are also placed into measuring and dispensing units from which the exact quantity can be automatically dispensed. Conventional gelatin capsules are then fed through the automatic filling machine, and the required quantities of each of the particular materials are poured into the capsules. The capsules are then closed and packaged in convenient quantities for distribution.

In treatment with the capsules of Example I, two capsules of the formula should be given to the patient each morning until the calcium deposit disappears. Radiographic techniques have proven very effective in checking on the disappearance of the deposit. The medication appears to function very satisfactorily with little or no side effects, even after prolonged usage.

Example II

Packets were made up having the following composition:

Calcium lactate (enteric coated) _____grains__ 20
Thiamine HCl _____grams__ 0.1
Methapyrilene HCl _____do____ 0.1
Aspirin (enteric coated) _____grains__ 5

The calcium lactate and aspirin are each given an enteric coating, as indicated above, made according to standard U.S.P. specifications. The coated materials, thiamine hydrochloride, and methapyrilene hydrochloride are then loaded into suitable measuring and dispensing units in an automatic packet filling machine. Conventional packets are fed through the machine, filled with the composition as described above, sealed, and packaged in convenient quantities for distribution.

In employing the composition of Example II, one packet should be given to the patient each morning until the calcium deposit disappears. Radiographic techniques can be used to check the progress of the treatment. The administration of the medication should be continued until the calcium deposit has cleared up. The length of treatment is dependent on the size of the deposit, but with daily administration the condition will be alleviated in a few weeks.

While treatment is continuing, it is recommended that the affected joint be exercised only minimally; this is particularly important if a large calcium deposit is present which would make the affected joint very sore.

Example III

An experiment was conducted to evaluate the effect of a combination of enteric coated calcium lactate, enteric coated aspirin, methapyrilene HCl, and thiamine HCl on calcific conditions in rats. Although several techniques can be used in producing calcium deposits in certain regions of the organism, in this experiment deposition of hydroxylapatite was produced by injecting two levels of potassium permanganate solution.

Sprague-Dowley female rats weighing between 80 and 100 grams were used for the study. Thirty rats were divided into four groups; two groups served as experimental groups and two groups served as control groups.

A treatment composition was formulated from the following ingredients.

|  | Gr. |
|---|---|
| Calcium lactate, N.F. (enteric coated) | 200 |
| Aspirin, U.S.P. (enteric coated) | 50 |
| Thiamine HCl, U.S.P. | 15.43 |
| Methapyrilene HCl, N.F. | 15.43 |

Prior to dosing the treament mixture was suspended in water in the ratio of 253 mg. of powder per cc. of water.

Each animal in the experimental group was given (orally) 253 mg. of powder mixture in 1 cc. of distilled water. Approximately one half hour after drug administration, both experimental and control animals were subcutaneously injected with potassium permanganate solution. The purpose of the potassium permanganate injection was to produce calcium deposits in several regions of the organism in the form of deposition of hydroxylapatite. Twenty-two of the rats received 200 µg./rat of potassium permanganate in 0.20 cc. of distilled water, and, similarly, eight rats received 100 µg./rat of potassium permanganate. Two weeks later all rats were killed and the lesions exposed and measured to the nearest 1 mm. The results are tabulated below, showing mm.$^2$ of lesions in the rats.

|  | 100 µg. KMnO$_4$ | | 200 µg. KMnO$_4$ | |
|---|---|---|---|---|
|  | Control | Experimental | Control | Experimental |
| Animal number: | | | | |
| 1 | 70 | 0 | 285 | 60 |
| 2 | 15 | 35 | 201 | 252 |
| 3 | 170 | 0 | 157 | 127 |
| 4 | 85 | 0 | 250 | 207 |
| 5 |  |  | 407 | 125 |
| 6 |  |  | 223 | 166 |
| 7 |  |  | 136 | 112 |
| 8 |  |  | 126 | 0 |
| 9 |  |  | 130 | 130 |
| 10 |  |  | 220 | 64 |
| 11 |  |  | 150 | 24 |
| Average | 85.00 | 8.75 | 207.73 | 115.18 |

It can be concluded from the above results that the composition used appears to cause reduction in calcium deposits produced by the injection of potassium permanganate solution.

While there has been described what are at present considered to be preferred embodiments of the invention, it will be understood that various modifications may be made therein which are within the true spirit and scope of the invention as defined in the appended claims.

What is claimed is:

1. A method for treating animals for pathological calcification and preventing the formation thereof comprising administering daily to said animals a medication comprising, in combination, from 65 parts to 972 parts by weight enteric coated calcium lactate, from 16 parts to 194 parts by weight enteric coated aspirin, from 10 parts to 60 parts by weight thiamine hydrochloride, and from 10 parts to 60 parts by weight of an antihistamine.

2. The method of claim 1 wherein the medication comprises from about 1 to about 15 grains of enteric coated calcium lactate, from about 0.25 to about 3.0 grains of enteric coated aspirin, from about 10 to about 60 milligrams of thiamine hydrochloride, and from about 10 to about 60 milligrams of an antihistamine.

3. The methods of claim 2 wherein the medication comprises about 10 grains of enteric coated calcium lactate, about 2.5 grams of fenteric coated aspirin, about 50 milligrams of triamine hydrochloride, and about 50 milligrams of an antihistamine.

4. The method of claim 3 wherein the antihistamine is methapyrilene hydrochloride.

5. A method for treating animals comprising administering to said animals a combination consisting essentially of, in combination, from 65 parts to 972 parts by weight enteric coated calcium lactate, from 16 parts to 194 parts by weight enteric coated aspirin, from 10 parts to 60 parts by weight thiamine hydrochloride, and from 10 parts to 60 parts by weight thiamine hydrochloride, and from 10 parts by weight of an antihistamine.

6. The method of claim 5 wherein the antihistamine is methapyrilene hydrochloride.

References Cited
UNITED STATES PATENTS
2,768,115   10/1956   Buckwalter et al. ____ 424—330

STANLEY J. FRIEDMAN, Assistant Examiner

U.S. Cl. X.R.

424—230, 234

UNITED STATES PATENT AND TRADEMARK OFFICE
CERTIFICATE OF CORRECTION

PATENT NO. : 3,842,169
DATED : October 15, 1974
INVENTOR(S) : Herbert D. Schneyer It is certified that error appears in the above–identified patent and that said Letters Patent are hereby corrected as shown below:

Claim 3, line 4, "triamine" should be --thiamine--.

Signed and Sealed this twenty-third Day of December 1975

[SEAL]

Attest:

RUTH C. MASON
Attesting Officer

C. MARSHALL DANN
Commissioner of Patents and Trademarks